April 18, 1939.   R. HUNTER   2,154,815
BRAKE FOR TRAILERS
Filed Dec. 30, 1937
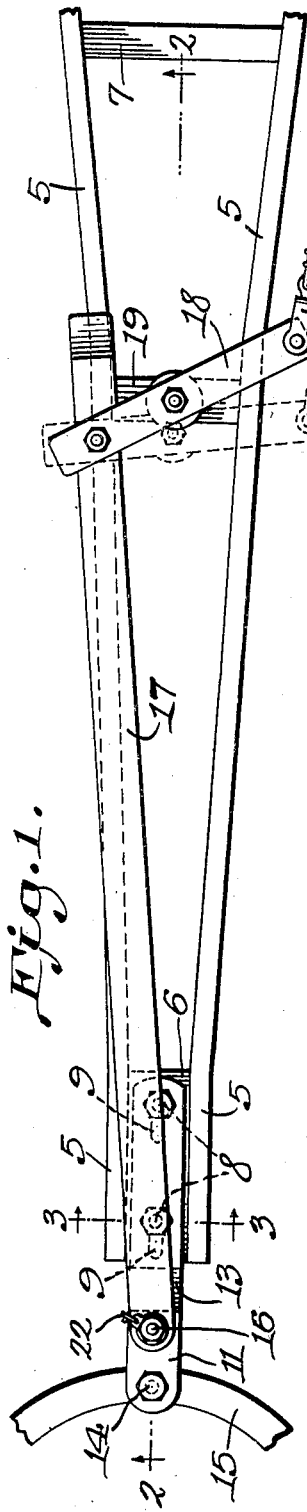
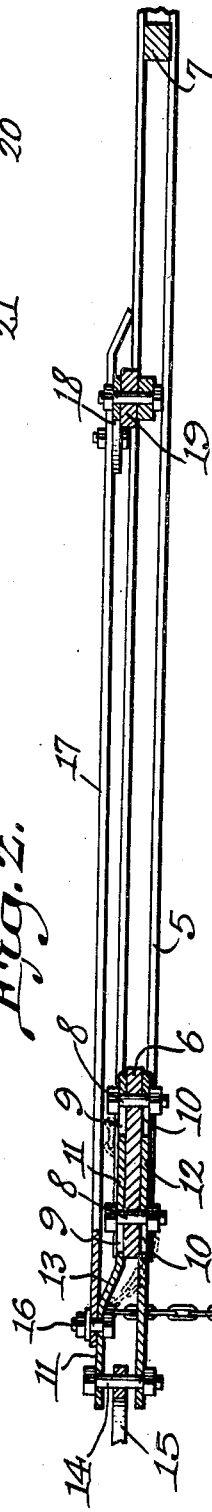
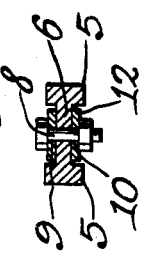
Ray Hunter
INVENTOR.
BY
ATTORNEYS.

Patented Apr. 18, 1939

2,154,815

UNITED STATES PATENT OFFICE 2,154,815

BRAKE FOR TRAILERS

Ray Hunter, Williston, N. Dak., assignor to Francis Raymond Hunter and H. M. Farrell, as co-owners in common, both of Williston, N. Dak.

Application December 30, 1937, Serial No. 182,595

1 Claim. (Cl. 188—142)

This invention relates to trailer hitch construction, the primary object of the invention being to provide a trailer hitch embodying means for automatically operating the brake mechanism of the trailer, by the movement of the power device or towing mechanism, to the end that rearward movement of the towing mechanism will cause the brakes of the trailer to be applied and forward movement of the towing mechanism will cause the brakes to be released, thereby insuring complete automatic control of the trailer.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawing:

Figure 1 is a plan view of a trailer hitch constructed in accordance with the invention.

Figure 2 is a sectional view taken on line 2—2 of Figure 1.

Figure 3 is a sectional view taken on line 3—3 of Figure 1.

Figure 4 is an elevational view of the upper movable bar of the hitch.

Figure 5 is an elevational view of the lower movable bar of the hitch.

Figure 6 is a fragmental plan view of the front end of the hitch.

Referring to the drawing in detail, the trailer hitch embodies bars 5 connected at their outer ends by means of the plate 6, the opposite ends of the bars being connected by means of the transverse bar 7, the inner ends of the bars 5 being secured under the trailer chassis in any desired manner.

As clearly shown by Figure 6 of the drawing, the plate 6 is provided with openings for the reception of the bolts 8, which also pass through aligning elongated openings 9 and 10 of the bars 11 and 12 respectively, thereby providing means whereby the bars 11 and 12 may move longitudinally of the bars 5. These bars 11 and 12 extend appreciable distances beyond the forward ends of the bars 5, the bar 11 being curved slightly upwardly as at 13. The bolt 14 connects the outer ends of the bars 11 and 12, which bolt affords means for connecting the curved bar 15 to the trailer hitch, the bar 15 providing means for connecting the trailer hitch to the usual bumper of the power device not shown.

Secured to the upper bar 11, by means of the bolt 16, is an actuating bar 17, that has its rear end pivotally connected to the bar 18 that is pivotally mounted on the transverse bar 19 that connects the side bars 5 at a point beyond the transverse bar 7.

The reference character 20 designates a cable that has its forward end pivotally connected to the bar 18, as by means of the link 21, the opposite end of the cable 20 being connected with the braking mechanism of the trailer, so that when the bar 18 is moved, a relative movement will be imparted to the cable 20, to actuate the braking mechanism not shown.

Connected with the forward end of the trailer hitch is a chain 22 that carries the wedge 23, the wedge 23 being of a size and shape to fit within one of the elongated openings 9 of the bar 11, to prevent movement of the bars 11 and 12 with respect to the bars 5, with the result that the actuating bar 17 will be also held against movement.

In the operation of the device, assuming that the power device or motor vehicle towing the trailer, moves rearwardly, it will be seen that the actuating bar 17 will be moved rearwardly, moving the bar 18 from the position shown in full lines in Figure 1 of the drawing, to the dotted line position. This movement results in the cable 20 being drawn forwardly actuating the brake mechanism with which it is connected.

Upon reverse movement of the actuating bar 17, the cable 20 will be returned to its normal position as shown in full lines in Figure 1 of the drawing and the brake will be thrown out of operation.

I claim:

A trailer hitch adapted to be secured to trailers having braking mechanism, comprising a pair of main bars connected at their forward ends, a pair of short bars having elongated openings mounted at the forward ends of the bars, bolts extending through the elongated openings of the latter bars slidably connecting the short bars on the main bars, a pivoted transversely extending bar mounted on the main bars near the inner ends thereof, an operating bar connected with one of the short bars and having pivoted connection with the pivoted transversely extending bar, whereby movement of the operating bar operates the transversely disposed bar, and a brake cable connected to one end of the transversely disposed bar, and adapted to move to operate the brakes of the trailer when the operating bar moves rearwardly.

RAY HUNTER.